BINARY TO DECIMAL BINARY CODE TRANSLATOR

Filed Dec. 10, 1962 4 Sheets-Sheet 1

BINARY TO DECIMAL BINARY CODE TRANSLATOR

Filed Dec. 10, 1962 4 Sheets-Sheet 2

3,242,323

BINARY TO DECIMAL BINARY CODE TRANSLATOR

Russell J. Marasco, Monroeville, Pa., assignor to Westinghouse Air Brake Company, Swissvale, Pa., a corporation of Pennsylvania Filed Dec. 10, 1962, Ser. No. 243,244
9 Claims. (Cl. 235—155)

This invention pertains to a binary to decimal binary code translator. More particularly, my invention relates to a translator arrangement for changing an ordinary binary number into a decimal binary code, the arrangement using a series of successive subtraction processes to accomplish the translation.

Various types of translating arrangements involving the changing of binary numbers into several types of codes are known in the art, including binary to decimal binary code translation. However, in these latter prior art arrangements, operation is based on successive division of the binary number by ten in binary form (1010). These known arrangements use complementary addition processes which requires circuitry to provide complements of both the input and output information. Such complementary producing arrangements increase, by a considerable degree, the amount of apparatus required, even when broadside input and output arrangements are used. Considerable reduction in the circuit and apparatus requirements is possible if the complementing devices may be eliminated from the translator arrangements. Such elimination may be accomplished by the use of straight binary subtraction processes to represent the successive divisions.

Accordingly, an object of my invention is a new and improved circuit arrangement for translating a binary number into a decimal binary code.

Another object of my invention is an arrangement using subtraction processes to translate a binary number into decimal binary code form.

It is also an object of my invention to provide an improved yet simple translator arrangement whereby an ordinary binary number representing a decimal number of any size may be changed into the equivalent decimal binay code having a four-bit sequence for each digit of the decimal number.

A further object of my invention is a binary to decimal binary code translator in which successive divisions by ten are accomplished by a series of successive subtractions during which the binary number ten is subtracted from selected sequences formed from the original binary number and the preceding subtractions.

Still another object of my invention is a circuit arrangement in which a straight binary sequence may be translated into a decimal binary code by successive subtractions of 1010 (binary ten), the subtraction series starting with the highest ordered bits of the binary number.

Other objects, features, and advantages of my invention will become apparent from the following specification when taken into connection with the accompanying drawings.

Figure 1A:
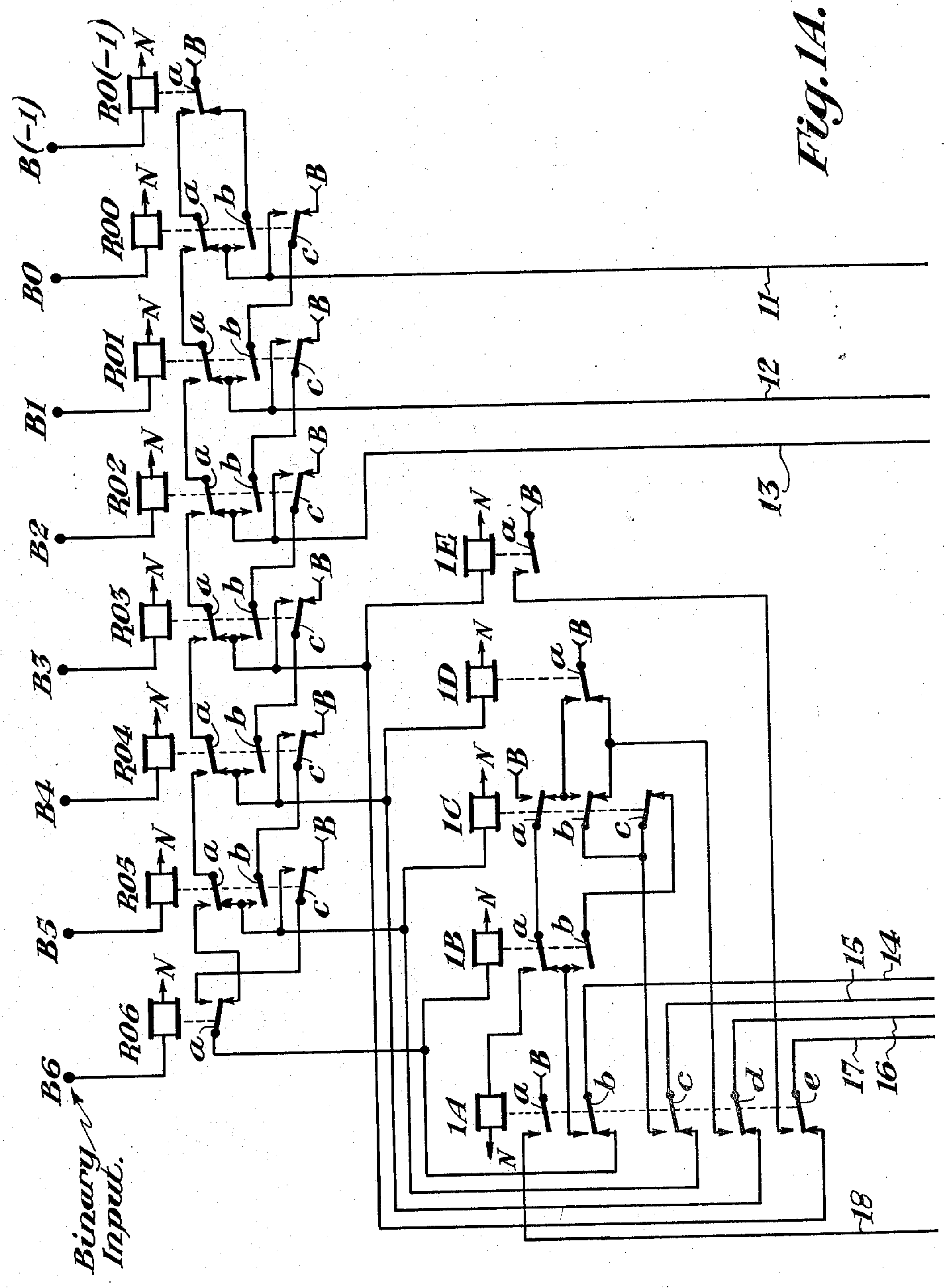
Figure 1B:
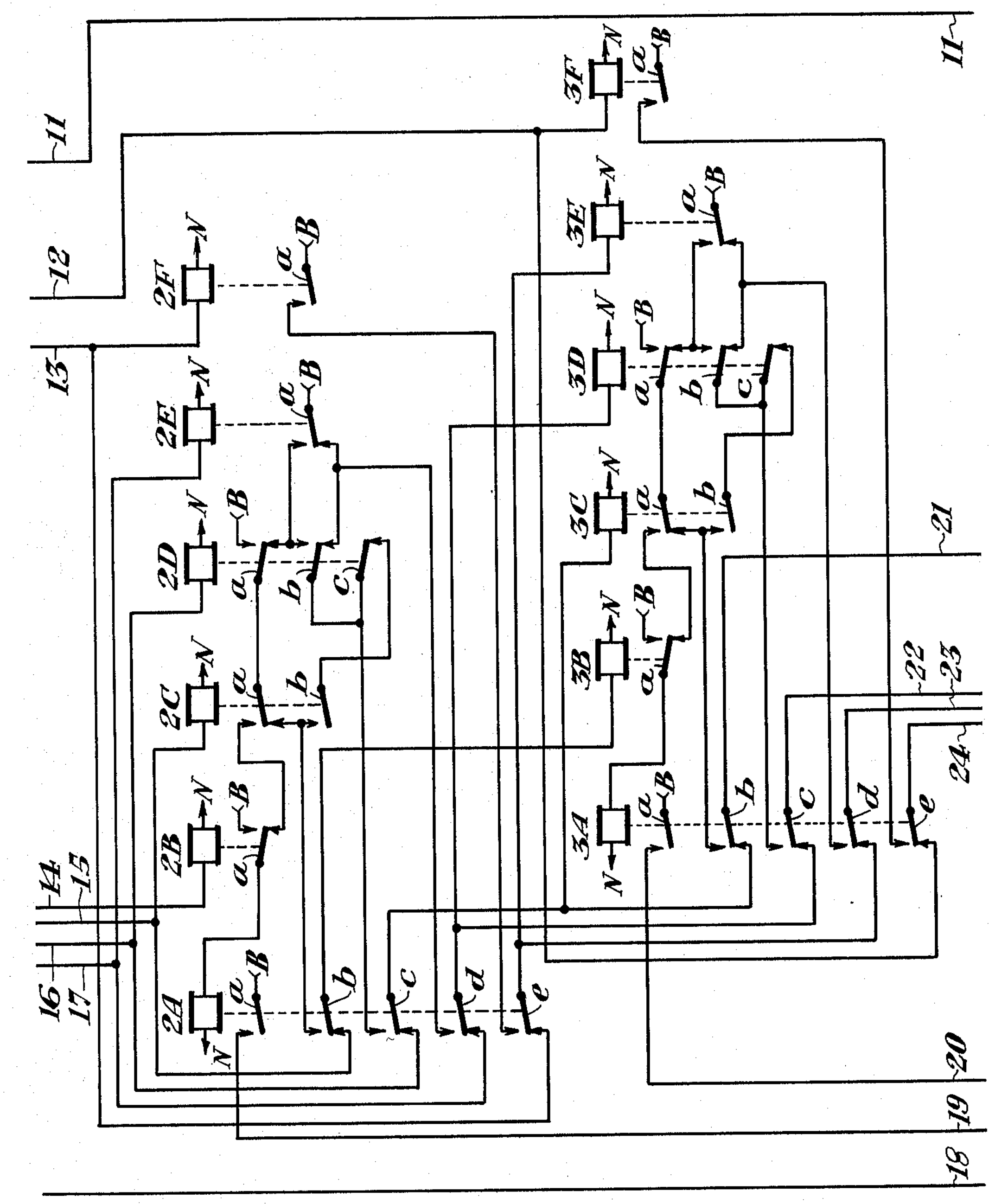
Figure 1C:
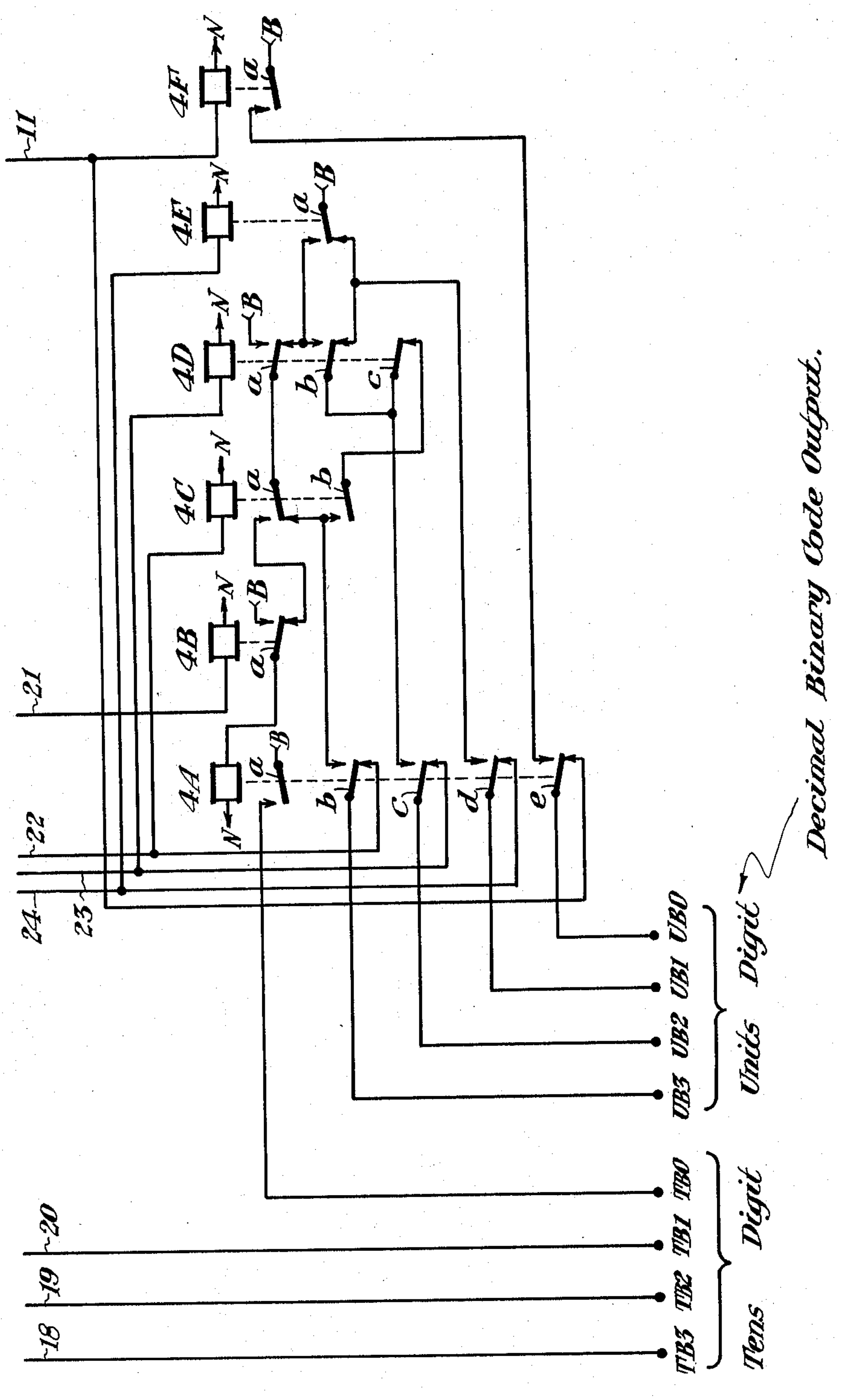

In describing the arrangement of my invention, I shall refer from time to time to the accompanying drawings in which:

FIGS. 1A, 1B, and 1C, when taken together in that order vertically, with each drawing placed horizontally and FIG. 1A at the top, show, by circuit diagram, apparatus for translating a seven-bit binary number into the equivalent decimal binary code, the arrangement shown embodying one form of my invention.

Figure 2:
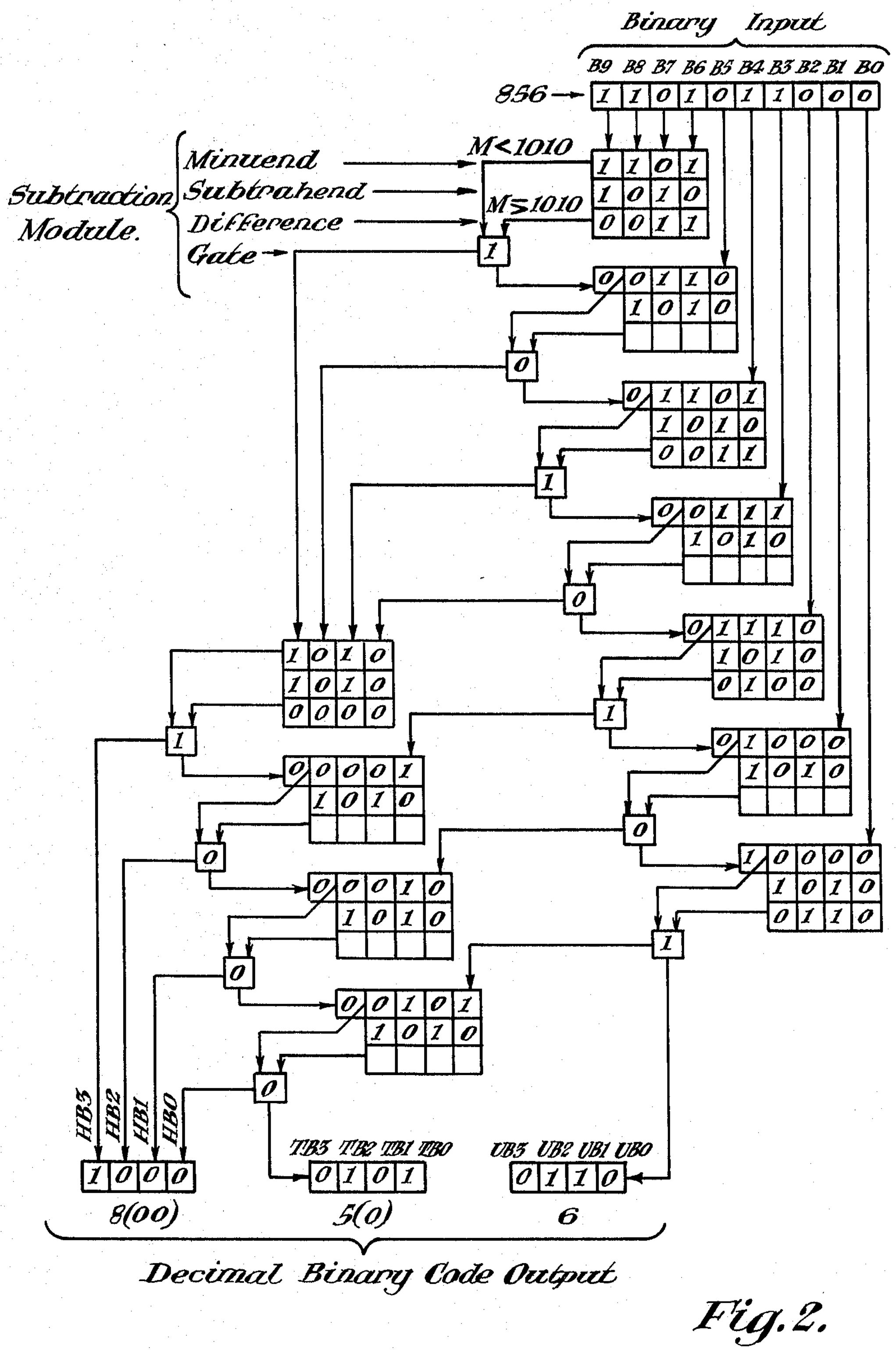

The block diagram of FIG. 2 illustrates, in conventional manner, a similar arrangement whereby a ten-bit binary number representing a three-digit decimal number is translated from ordinary binary form into decimal binary code.

In each of the figures of the drawings, similar reference characters represent similar parts of the apparatus.

The operating philosophy of the arrangement embodying my invention is translation from binary to decimal binary code by binary division by ten (1010). This division is accomplished by repetitive subtractions of ten in binary form, working from the left of the original binary number, that is, from the higher order binary bits. These successive subtraction processes are accomplished using the normal rules regarding borrowing and the magnitude of the various numbers. Said in another way, if the minuend is equal to or greater than the subtrahend, then borrowing as necessary for the individual bits terminates before the most significant bit in that particular process is reached and the resulting difference is positive. However, if the minuend is less than the subtrahend, the difference will have a negative sign which will be indicated by a "borrow" from the most significant bit position. These two situations, that is, the no-borrow and the borrow conditions, are indicated by an equivalent quotient symbol which is a binary 1 or 0, as the difference is positive or negative, respectively.

In binary division by successive subtractions, the number of subtraction steps required, and hence the number of bits in the quotient, may be expressed by the equation:

$$N=(n_x-n_y)+1 \qquad (1)$$

where $N$=number of subtraction steps (bits in quotient)
$n_x$=number of bits in dividend
$n_y$=number of bits in divisor In this particular application, the divisor is always ten, i.e., in binary form 1010. Thus $n_y$ is equal to 4 and Equation 1 above becomes:

$$N=n_x-3 \qquad (2)$$

The translation of a seven-bit binary number in the translator arrangement embodying my invention therefore requires four subtraction steps and will produce a quotient of four bits. These four bits of the quotient represent the tens digit in 8–4–2–1 decimal binary code notation. The remainder, taken from the last subtraction step and which is always four bits, represents the units digit in this type of decimal binary code notation.

As a specific example, the translation of the binary representation of decimal number 66 as shown in the chart immediately below:

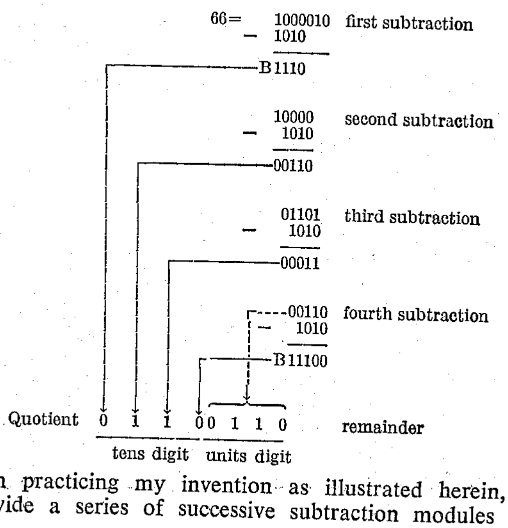

In practicing my invention as illustrated herein, I provide a series of successive subtraction modules of two different sizes. In each module, the minuend is registered in a bank of relays in binary sequence form, the value of which varies in accord with the original binary number. The contact matrix of these relays forms a fixed subtrahend for the subtraction step. As previously indicated, this subtrahend is fixed at binary 1010 which is equivalent to division by ten. The initial module of the series receives and stores four binary bits, specifically, the four highest ordered bits of the ordinary binary number input. Thus, this first module requires four subtraction relays. The binary number input may be received directly from a signal source as a sequence of binary signals. Or as shown herein, the binary input may be received into a round-off relay bank. This round-off bank converts or "rounds-off" the binary input number to the nearest whole number. To accomplish this, the binary bits to the right of the binary point are analyzed. If these bits to the right of the binary point are equal to or greater than decimal ½, a binary one is added to the whole number binary sequence. Otherwise, the fractional binary bits are eliminated.

In addition, each module includes a quotient recorder, which may also be termed a quotient gate, operable to a first and a second condition. As specifically shown, the quotient recorder or gate is a relay which is energized or deenergized as a subtraction process is or is not possible. In other words, when the minuend is greater than or at least equal to the subtrahend, the quotient recorder relay is energized. If the minuend is less than the fixed subtrahend, the quotient gating relay remains deenergized since a subtraction is not possible, that is, the difference has a negative sign. When the gate relay is energized, circuits are arranged to transfer the subtraction difference, of positive sign, to the subtraction relays of the next module in the succession where the difference is registered as the first portion of the minuend sequence. If the gating relay is deenergized, the transfer circuit is shifted to register in the next module the last four bits of the binary sequence stored in the associated module. After the initial module, each module includes, in addition to the gate or quotient recorder relay, five subtraction relays. Since only a four-bit sequence is transferred into a module from the preceding module, the extra or final bit is received from the input source. As specifically shown herein, this fifth bit which is added as the last bit of the new sequence is received directly from the round-off relay bank.

Each of the further subtraction steps uses the same fixed subtrahend (1010) established by the contact matrix of the subtraction relays. Each transfer operation of the sequence into the succeeding module is similar. In other words, the difference or the last four bits of the minuend is transferred in accordance with the relative size of the minuend and subtrahend. To this is added, as the last bit of the variable minuend binary sequence, the next lower order bit of the input binary number not previously used. The decimal binary code output receives the four-bit sequence representing the units digit from the last subtraction module. This sequence, which is equivalent to the remainder of the division process, is represented by the difference of the subtraction step if of positive sign or by the last four bits of the minuend registered in the final module if this is less than 1010. When the arrangement is such that the input binary number is always less than 100 (decimal), i.e., is the equivalent of a two digit decimal number, the tens digit of the decimal binary code is established from the quotient recorder relays as a four-bit sequence, the highest ordered bit being taken from the recorder or gate relay of the first module. It will be remembered that, from Equation 2 above, the total number of modules for a seven-bit input is four so that there are thus four gate relays to provide the four-bit sequence for the tens digit.

If the input binary number represents 3 or more decimal digits an additional series of subtraction modules is required for each extra decimal digit over two. Each extra series of modules receives its input from the gate relays of the preceding series of modules. For these larger translator arrangements, the units digit output is the same as that previously described. If we assume that 3 digits decimal are represented, the decimal binary code tens digit sequence is obtained from the remainder in the last module of the second series of subtraction modules, the actual sequence being taken from the subtraction difference or the minuend of this module. In this assumed number, the hundreds digit of the decimal binary code is then obtained from the gate relays associated with the second series of subtraction modules.

I shall now describe the apparatus embodying my invention in more detail with specific reference from time to time to the accompanying drawings. Following this, I shall point out the novel features of my invention in the appended claims.

It is to be noted that the apparatus shown by circuit diagram in the various parts of FIG. 1 is provided with a source of direct current energy. Any of various types of such direct current sources may be used. For example, the source may be a battery, a generator, or a rectifier of proper size and voltage. Since the supply of such energy to the apparatus is conventional, the specific source is not shown in detail. However, the positive and negative terminals of the source are represented in the drawing by the reference characters B and N, respectively.

Referring now to FIGS. 1A, 1B, and 1C, taken together in the manner previously described, it will be seen that two types of subtraction modules are used in the circuit arrangement illustrated. The initial module of the series, shown in FIG. 1A, includes four subtraction relays designated as relays 1B, 1C, 1D, and 1E. This module also includes one quotient recorder or gating relay 1A. Each of the remaining modules shown is provided with five subtraction relays and one gating relay. In each of the modules, the similar subtraction relays are designated by similar reference characters with distinguishing numerical prefixes in accordance with the module number. Similarly, the A relay in each module is the quotient or gating relay. Since the arrangement shown in these drawings has the capacity for handling a seven-bit binary number input, in accordance with the previously discussed equation, four substraction modules are required. It is to be noted that a standard contact matrix is used in each module, even though some of the specific circuits will never be used in certain modules.

Each of the gating or A relays is energized over a "Not Borrow" line which is principally controlled by the subtraction relay occupying the most significant bit position in that module. Secondary control is exercised by the remaining subtraction relays with the exception of the relay in the least significant bit position. For example, in the initial module, relay 1A is energized by a circuit which includes front contact *a* of relay 1B, a first path over front contact *a* of relay 1C, and a second path including back contact *a* of relay of 1C and front contact *a* of relay 1D. It is obvious from the examination of this circuit that it is completed to energize the winding of relay 1A only when the four-bit minuend registered in this module is at least equal to the fixed subtrahend established by the relay contact matrix. In the remaining modules, as for example the second module shown in FIG. 1B, the primary circuit for the gating relay 2A includes only front contact *a* of relay 2B since, if relay 2B is energized, the minuend is obviously larger than the fixed subtrahend. Other circuits for relay 2A may be traced over back contact *a* of relay 2B and front contact *a* of relay 2C, branching then into two paths, one over front contact *a* of relay 2D and the other including back contact *a* of relay 2D and front contact *a* of relay 2E. Each A relay produces voltage or no voltage on a quotient line to the output terminals. For example, if relay 1A is energized, terminal B of the battery is connected over front contact *a* of this relay to line 18 and thus to output terminal TB3 shown in FIG. 1C, the significance of which will be described more fully hereinafter.

Each A relay, in accordance with the position of its contacts *b* through *e*, inclusive, establishes the circuits for transferring the remainder, i.e., the subtraction difference or a selected portion of the minuend, from the associated module to the next successive module of the series. For the final module, this transfer is to the units digit output terminals of the decimal binary code. It may be observed that when energy appears on a particular "Not Borrow" line so that the corresponding gating relay is energized, it is the subtraction difference that is transferred to the subtraction relays of the next module. On the other hand, when no voltage appears on the Not Borrow line and the gating relay remains deenergized, the last four bits of the input to the corresponding module, that is, the last four bits of the minuend registered therein, are transferred to the next succeeding module. The use of the Not Borrow signal, a form of negative logic, in this translator eliminates the need for commutating the energy source to the translator to effect the translation. Because the Not Borrow signal is used, all relays are deenergized when voltage is absent simultaneously on all of the binary input lines.

The input sequence to the subtraction relays of the first module is from the binary signal source through the round-off relay bank which will be described in more detail shortly. Input to the other modules, as previously indicated, is from the same source for the last bit of the registered minuend sequence and from the preceding module in the series for the first four bits of the sequence. For example, one circuit which may be traced for relay 2D in the second module extends from terminal B over back contact *a* of relay 1D in the first module, front contact *d* of relay 1A, wire 16, and the winding of relay 2D to terminal N. However, if relay 1A is deenergized and released, the circuit for relay 2D is transferred to back contact *d* of relay 1A and thus becomes a branch of the input circuit for relay 1D. Under this condition, relay 2D repeats the position of the similar relay in the first module. It may also be noted that the circuit for relay 2F extends directly from the round-off relay bank where energy may or may not be applied to wire 13 in accordance with the position of the round-off relays which repeat the original input.

I shall now describe the translation of a specific binary number into decimal binary code in connection with the circuit arrangement shown in the various portions of FIG. 1. For simplicity, the same example shown in the chart in the general description of my invention will be used, that is, the translation of the number 66. However, in order to illustrate the purposes of the round-off relay bank, the actual input is assumed to be the decimal number 65.6 for which the approximate binary equivalent is 1000001.10011. In the illustrated circuit arrangement, this binary input appears on the terminals shown across the top of FIG. 1A, that is, reading from left to right, terminals B6 through B0 and terminal B(−1). In this array of input terminals, the binary point appears between the final two terminals at the right, that is, terminals B0 and B(−1). Only the first bit to the right of the binary point is used in the round-off bank since this bit, representing the fraction ½ in decimal notation, is sufficient to determine the necessity for round-off to a whole number.

Each of the input terminals is connected directly to the winding of the corresponding round-off relay R0, also shown in FIG. 1A. It is to be noted that each numerical suffix in the reference characters for the round-off relays and for the corresponding input terminals is equivalent to the exponent or power of the number 2 which the corresponding binary position represents. In the usual manner, when a binary 1 is to appear in the corresponding position of the input binary number, energy from positive terminal B of the source appears on the input terminal.

When binary 0 occupies the particular position, the input terminal remains deenergized. Thus, it is to be seen that when the left hand terminal B6 is energized, the corresponding value of this terminal is then $2^6$. When energy does appear on an input terminal, it is obvious from the previously mentioned connections that the corresponding R0 relay is energized and picks up. If the round-off action is not desired or necessary, the input terminals are connected directly into the translation circuit arrangement. Under these conditions, the subtraction relays of the first module, that is, relays 1B to 1E would be energized directly from input terminals B6 through B3, respectively.

Continuing the assumption, however, that the round-off relay bank is used and that the input binary number is as described in the preceding paragraphs, round-off relays R06, R00, and R0(−1) will be energized. In transferring the highest ordered bits of this binary input number into the first subtraction module, an energizing circuit exists for relay 1B extending from terminal B over back contact *c* of relay R05, front contact *a* of relay R06, and the winding of relay 1B to terminal N. Relay 1B is thus energized and picks up. However, relay 1C remains deenergized since its circuit, tracing back from the relay winding and including back contact *a* of relay R05, is interrupted at open front contact *a* of relay R04. In a similar manner, the circuits for relays 1D and 1E are interrupted under the exsiting conditions at, respectively, front contact *a* of relay R03 and front contact *a* of relay R02. Continuing the description of the transfer from the round-off bank into the various modules of the translator, it is to be seen also that lead 13, which leads to the winding of relay 2F in FIG. 1B, is deenergized since the circuit over back contact *a* of relay R02 is interrupted at front contact *a* of relay R01. However, lead 12 is connected to terminal B of the source over back contact *a* of relay R01, front contact *a* of relay R00, and front contact *a* of relay R0 (−1). The final lead to the subtraction modules, lead 11, is extended over front contact *b* of relay R00, but is disconnected from terminal B at back contact *a* of relay R0(−1). It is thus apparent that the round-off process results in the binary number 1000010, which is the equivalent of decimal 66, being entered into the various subtraction modules. Specifically, in the first module, the binary sequence registered in the relays is 1000.

The contacts of relays 1B, 1C, 1D, and 1E of the first module are arranged in a matrix to process the subtraction of the fixed subtrahend, binary 1010, from the sequence registered in the subtraction relays. Since the registered sequence is 1000, it is obvious that the fixed subtrahend is larger than the registered minuend and no subtraction process is possible. In other words, the difference resulting from the subtraction will have a negative sign. As a result, the Not Borrow lead to the winding of relay 1A from front contact *a* of relay 1B, this contact being closed, is deenergized, the circuit under the existing conditions extending over back contact *a* of relay 1C to open front contact *a* of relay 1D. Thus, relay 1A remains deenergized and its front contact *a* remains open. Since no energy appears on lead 18, the quotient signal on this lead, which is connected to an output terminal TB3 shown in FIG. 1C, is the equivalent of a binary bit 0.

With relay 1A released, the winding of relay 2B in FIG. 1B is connected in multiple, over back contact *b* of relay 1A and lead 14, with the winding of relay 1B. Thus, in the same manner that relay 1B is energized, relay 2B is energized and picks up. In a similar manner, the windings of relays 2C, 2D, and 2E are connected in multiple, respectively, with the windings of relays 1C, 1D, and 1E of the first module. These connections are completed over leads 15, 16, and 17 and back contacts *c*, *d*, and *e* of relay 1A, respectively. Since these relays in the first module are presently deenergized, no energy is provided to the corresponding relays in the second module and they likewise remain in their released condition. It was previously described that no energy exists on lead 13 connected to the winding of relay 2F so that this final relay in module 2 is also deenergized and remains in its released condition. It is obvious, then, that the sequence transferred or otherwise entered into the subtraction relays of the second module represents binary sequence 10000.

The contact matrix formed by the subtraction relays of the second module also subtracts the fixed subtrahend 1010 from the registered sequence. Here the subtrahend is less than the registered sequence so that a subtraction process is possible since the difference will have a positive sign. With relay 2B energized, its front contact *a* is closed to complete a circuit for energizing the Not Borrow line and thus gating relay 2A which picks up. The closing of front contact *a* of relay 2A supplies energy from terminal B to lead 19 which connects to output terminal TB2, this energy representing binary bit 1 on this terminal. The remaining front contacts of relay 2A are also closed, thus shifting the transfer circuits to enter the difference of the subtraction process in the second module into the subtraction relays of module 3. Tracing back from the winding of relay 3B, it is seen that the circuit extends over front contact *b* of relay 2A, back contact *a* of relay 2C, and back contact *a* of relay 2D to front contact *a* of relay 2E. Since this last contact is open, the circuit is interrupted and relay 3B remains deenergized and in its released condition. However, a circuit for relay 3C exists, extending from terminal B over back contact *a* of relay 2E, back contact *b* of relay 2D, front contact *c* of relay 2A, and the winding of relay 3C to terminal N. This relay is thus energized and picks up. The existing circuit for relay 3D includes back contact *a* of relay 2E and front contact *d* of relay 2*a*. Since both of these contacts are closed, relay 3D is energized and picks up. However, the circuit for relay 3E, which includes front contact *e* of relay 2A, is open at front contact *a* of relay 2F so that relay 3E remains deenergized. An existing circuit was previously traced for providing energy to lead 12, which is obviously connected to the winding of relay 3F, which is thus energized and picks up. Accordingly, there is registered in the subtraction relays of the third module the binary sequence 01101.

The minuend registered in the subtraction relays of the third module is obviously greater than the subtrahend 1010 fixed by the contact matrix of these relays and subtraction is thus possible, that is, the difference is positive. Energy is supplied to the Not Borrow line from terminal B over front contact *a* of relay 3D, front contact *a* of relay 3C, and back contact *a* of relay 3B, thence through the winding of relay 3A to terminal N. Relay 3A picks up to close its front contact *a*, supplying energy to lead 20 which is connected to terminal TB1. Again the energy on this lead represents the binary bit 1 at the terminal location. Since relay 3A is energized, its front contacts *b* through *e* are closed to complete the transfer circuits for entering the difference resulting from the third subtraction process into the subtraction relays of the fourth module. The circuit to the winding of relay 4B including lead 21, front contact *b* of relay 3A, and front contact *b* of relay 3C is interrupted at open back contact *c* of relay 3D. Relay 4B thus remains in its released condition. A similar situation exists for relay 4C, the circuit including lead 22, front contact *c* of relay 3A, and front contact *b* of relay 3D being open at front contact *a* of relay 3E so that relay 4C also remains released. An existing circuit for energizing relay 4D extends from terminal B over back contact *a* of relay 3E, front contact *d* of relay 3A, lead 23, and the winding of relay 4D to terminal N. Relay 4E is also energized, the circuit including lead 24, front contact *e* of relay 3A, and front contact *a* of relay 3F. As was previously described, there is no energy on lead 11 from the round-off relay bank and relay 4F thus remains deenergized and in its released condition. The sequence thus registered in the subtraction relays of the fourth module is 00110.

This registered minuend is less than the subtrahend fixed by the contact matrix and no subtraction action is possible. The Not Borrow lead to the winding of relay 4A is deenergized, the circuit being interrupted at front contact *a* of relay 4C. Relay 4A thus remains in its released condition and the circuit to output terminal TB0 is interrupted at open front contact *a* of this relay so that the binary bit 0 appears at this output terminal. This completes the quotient records of the subtraction modules which provide the tens digit output of the decimal binary code. As was previously indicated, this output appears at terminals TB3, TB2, TB1, and TB0 in the lower left of FIG. 1C. With energy applied to leads 19 and 20 connected to terminals TB2 and TB1 and with no energy applied to terminals TB3 (lead 18) and TB0, the output sequence is thus 0110 which is the binary equivalent of the decimal number 6.

With no subtraction possible in this fourth module and back contacts of relay 4A closed, the final four bits of the minuend sequence are transferred to the output terminals for the units digit. With back contact *b* of relay 4A closed, the connection to terminal UB3 branches from the circuit to the winding of relay 4C. Since this latter relay is deenergized, no energy appears at output terminal UB3, this condition being representative of the binary bit 0. The connections to terminals UB2 and UB1 over back contacts *c* and *d*, respectively, of relay 4A branch from the circuits to the windings of relays 4D and 4E, respectively. Since each of these relays is energized, energy likewise appears on the output terminals to provide an energized condition representing the binary bit 1. Lead 11 connected to the winding of relay 4F branches over back contact *e* of relay 4A to output terminal UB0. However, since no energy appears on lead 11, the output terminal also remains deenergized to provide an output signal of binary 0. Thus these terminals likewise are energized in a sequence 0110. The complete decimal binary code output then equals the two sequences 0110 and 0110 from the two sets of terminals. Since each of these sequences is equivalent to the decimal number 6, the output is equivalent to decimal number 66, the same as the number represented by the binary input when rounded off to the nearest whole number.

Referring now to FIG. 2, I shall describe the operation of the system of my invention when translating a binary number representing a three digit decimal number. This drawing figure shows a schematic diagram of such an arrangement using conventional blocks to represent the various elements of the apparatus required by the system. The basic circuits are shown in the system illustrated in the various parts of FIG. 1. It is believed, with these basic circuits, that an understanding of the larger arrangement of FIG. 2 is possible with only a conventional showing and no detailed circuitry. In each of the subtraction modules illustrated in FIG. 2, and with particular reference to the notes associated with the first module, each of the blocks in the minuend row represents a subtraction relay. Each small block in the subtrahend row represents the contacts of the corresponding relay of the row above. In the third or difference row, each block represents the leads to the next module which are taken through the quotient recorder or quotient gate in order to establish whether the difference or minuend is transferred. The gate block represents the gate or quotient recorder relay which in FIG. 1 is designated by the general reference character A. The conventional blocks in the final row at the bottom of FIG. 2, divided into four-block sequences, represent the various groups of output terminals forming the decimal binary code and will be more fully explained shortly. In the upper right of FIG. 2, the input terminals are represented by the series of conventional blocks. Each block is designated by reference character similar to those designating the input terminals in FIG. 1A although here, of course, there are more terminals, ten in all being required. No round-off arrangement is included in this conventional showing, and the binary bits of the input number, there being no bits to the right of the binary point, are fed directly into the modules.

The binary symbols 1 and 0 within each block representing the input terminals indicate the energized and deenergized condition, respectively, of these terminals under the assumed input condition for this description. With energy applied or not applied as indicated, o.e., binary bit 1 or 0, the binary number input is the equivalent of decimal number 856. A similar arrangement is used to indicate the condition of the decimal binary code output terminals. The 1 and 0 symbols within the blocks representing the subtraction and gate relays indicate the corresponding relay energized or deenergized, respectively, under the assumed conditions. The subtrahend rows of blocks are marked to designate that the contact matrix of each module is so arranged as to subtract the fixed binary number 1010 from the registered minuend. If a subtratcion is possible, i.e., the difference is positive, the binary symbols in the difference row of blocks of the module indicate the binary sequence transferred to the following module. If no subtratcion is possible, i.e., the difference has a negative sign, the difference row blocks are blank and the transfer is from the minuend.

The subtraction modules for determining the units digits of the decimal binary code are shown in vertical succession at the right of FIG. 2. In accordance with the previously discussed formula (2), which in the present situation reduces to the ten input bits minus the fixed number 3, seven modules are required. The four highest order bits from the input terminals are fed directly into the subtraction relays of the first module, as is indicated by the vertical arrows. As indicated symbolically to the left of this module, the gate actuates a transfer into the next or second module from the difference of the subtraction process if the registered minuend is greater than or at least equal to the fixed subtrahend of 1010. Under this condition, the gate assumes its first condition, that is, binary 1, and the gate relay picks up. The gate, however, actuates a transfer from the minuend when this sequence is less than the fixed 1010 subtrahend. As previously described, this transfer is selected from the last four bits of the minuend sequence, except in the first module from which all the registered bits (4) are transferred. When this condition prevails, the gate assumes its second condition, that is, the equivalent of binary 0, with the relay released.

The various subtraction processes in the succession of modules are indicated by the binary symbols within the conventional blocks. The gate relays become energized or deenergized as indicated by the symbols 1 and 0, respectively. In the final or seventh module of this first succession, subtraction is possible since the minuend is larger than the fixed subtrahend. The difference resulting from the substraction process is transferred to the units digit output terminals for the decimal binary code. As indicated, the remainder sequence transferred to the output terminals is 0110 which is the binary equivalent of the decimal number 6.

The binary bits represented by the condition of the recorder or quotient gates associated with the first series of subtraction modules provide the input for the next succession of subtraction modules shown in the lower center of FIG. 2. Since there are seven bits available, corresponding to the seven subtraction modules in the original series, four subtraction modules and/or quotients are required for the second succession. The quotient bits represented by the first four gate relays of the first succession provide the input to the first module of the second series while the binary bits represented by the remaining three quotient gates are fed successively into the other modules, one into each module, to provide the final bit in the module sequence. Again, the subtraction process occur as indicated in the diagram. In this case, in the last module of the series, no subtraction is possible since the minuend is smaller than the fixed subtrahend. The corresponding gate is thus in its second condition and the last four bits of the minuend are transferred as the remainder to the tens digit output terminals for the decimal binary code, the terminals TB3 to TB0, inclusive. Here the remainder sequence representing the tens digit at the output terminals is the sequence 0101, which is the binary equivalent of the decimal number 5. The hundreds digit output appearing at terminals HB3 to HB0, inclusive, is taken from the second series of gate relays. This output process is indicated schematically in FIG. 2 and is similar to that described in the smaller arrangement illustrated in the various parts of FIG. 1. Here the output is the sequence 1000 in accordance with the condition of the quotient gates, this sequence being the binary equivalent of the decimal number 8. Thus, the resulting decimal binary code, comprising the three separate bit sequences, represents the decimal number 856, the same as the input.

The arrangement of my invention thus provides an improved means of translating binary numbers into decimal binary code. Since binary subtraction is used to accomplish the binary division, no complementing devices are required in the translator. The subtraction modules require only single coil, general purpose relays, one per binary bit, whereas prior art subtracters require two relays per bit or a special purpose; e.g., double coil, relay for each bit. No timing devices are required as the translator receives the input sequence broadside and supplies a broadside output. The repetitive use of only two similar types of subtraction modules facilitates the expansion of the system to handle any number of input bits. The translator is also adaptable to any system which can provide inputs on a voltage, no-voltage basis to represent binary 1 and 0, respectively.

Although I have herein shown and described but one form of translator embodying my invention, it is to be understood that various changes and modifications may be made within the scope of the appended claims without departing from the spirit and scope of my invention.

Having thus described my invention, what I claim is:

1. Apparatus for translating from a binary number to a decimal binary code, comprising in combination, (a) a source of signals representing a binary number, (b) a successive series of subtraction modules each capable of registering a variable binary sequence and subtracting therefrom a preselected fixed binary sequence, (c) means for supplying the four highest order bits of said binary number to the first module of said series as the variable binary sequence, (d) a series of quotient recorders one associated with each module and controlled thereby to a first condition when the subtraction is completed and to a second condition when said fixed sequence is greater than the received variable sequence, (e) each module other than the first module being controlled by the preceding module in said series and that associated quotient recorder for registering as the first portion of its variable sequence the remainder resulting from the subtraction in the preceding module, (f) each other module having connections from said source for registering the next unused lower order bit into that module as the final bit of the variable sequence, (g) output means controlled by said quotient recorders and by the final module of said series for supplying a decimal binary code sequence equivalent to the input binary number.

2. Apparatus for translating from a binary number to a decimal binary code, comprising in combination, (a) a source of signals representing a binary number,
(b) a successive series of subtraction modules each capable of registering a variable binary sequence and subtracting therefrom a preselected fixed binary sequence,
(c) means for supplying the four highest order bits of said binary number to the first module of said series as the variable binary sequence,
(d) a series of quotient recorders one associated with each module and controlled thereby to a first condition when the subtraction is completed and to a second condition when said fixed sequence is greater than the received variable sequence,
(e) each module other than the first module being controlled by the preceding module in said series and that associated quotient recorder for registering as the first portion of its variable sequence the difference resulting from the subtraction in the preceding module when that associated quotient recorder is in its first condition and the last four bits of the variable sequence registered by the preceding module when that associated recorder is in its second condition,
  (1) each other module also being controlled by said source for transferring the next unused lower order bit into that module as the final bit of the variable sequence,
(f) output means controlled by said quotient recorders and by the final module of said series for supplying a decimal binary code sequence equivalent to the input binary number.

3. The combination of apparatus, for translating a binary number into the equivalent decimal binary code, comprising;
(a) a source of a plurality of signals representing a binary number,
(b) a successive series of subtraction modules each capable of registering a variable binary sequence and subtracting therefrom the fixed binary sequence 1010,
(c) a series of quotient gates one associated with each module and controlled thereby to a first condition when the sequence 1010 is less than or equal to the registered variable sequence and to a second condition when the sequence 1010 is greater than the registered variable sequence,
(d) means for supplying the four highest order bits of said binary number to the first module of said series as the variable binary sequence,
(e) each module other than the first module being controlled by the preceding module in said series and that associated quotient gate for registering as the first portion of its variable sequence the difference resulting from the subtraction in the preceding module when that associated quotient gate is in its first condition and the last four bits of the variable sequence registered by the preceding module when that associated gate is in its second condition,
  (1) each other module also controlled by said source for transferring the next unused lower order bit into that module as the final bit of the variable sequence,
(f) output means controlled by said quotient gates and by the final module of said series for supplying a decimal binary code sequence equivalent to the input binary number.

4. A binary to decimal binary code translator, comprising in combination;
(a) a source of signals representing a binary number having *n* bits,
(b) a first subtraction module controlled by said source for storing the four highest order bits of said binary number and subtracting therefrom a preselected fixed binary sequence,
(c) a first quotient recorder controlled by said first module for recording a first condition when the subtraction is completed and a second condition when said fixed sequence is greater than said highest order four bits,
(d) a successive series of other subtraction modules numbering ($n$–4) each capable of receiving a five bit binary sequence and subtracting therefrom said preselected fixed binary sequence,
(e) a series of other quotient recorders one associated with each other subtraction module,
(f) each other module being controlled by the preceding module and that associated quotient recorder for receiving the difference of the preceding subtraction when that quotient recorder is in its first condition and for receiving the final four bits of the binary sequence stored in the preceding module when that associated recorder is in its second condition,
(g) each other module also controlled by said source for receiving the next unused lower order bit of said binary number to complete the five bit binary sequence for that module,
(h) output means controlled by said quotient recorders and by the last module of said successive series for producing a decimal binary code equivalent to said binary number from said source.

5. The combination of apparatus, for translating a binary number into the equivalent decimal binary code, comprising;
(a) a source of signals representing a binary number having *n* bits,
(b) a first subtraction module controlled by said source for registering in sequence the four highest order bits of said binary number and subtracting therefrom the fixed binary sequence 1010,
(c) a first quotient recorder controlled by said first module for registering a first condition when the subtraction is completed and a second condition when said 1010 sequence is greater than said highest order four bits,
(d) a successive series of other subtraction modules numbering ($n$–4) each capable of registering a five bit binary sequence and subtracting therefrom said fixed binary sequence 1010,
(e) a series of other quotient recorders one associated with each other subtraction module,
(f) each other module being controlled by the preceding module and that associated quotient recorder for registering the difference resulting from the preceding subtraction process when that associated quotient recorder is in its first condition and for registering the final four bits of the binary sequence registered in the preceding module when that associated recorder is in its second condition,
(g) each other module also being controlled by said source for registering the next lower order unused bit of said binary number to complete the five bit binary sequence registered in that module,
(h) output means controlled by said quotient recorders and by the last module of said successive series for producing decimal binary code sequences equivalent to said binary number received from said source.

6. Apparatus for translating a binary number into the equivalent decimal binary code, comprising in combination;
(a) a source of a plurality of signals representing a binary number,
(b) a successive series of subtraction modules each capable of registering a variable binary sequence and subtracting therefrom a preselected fixed binary sequence,
(c) a series of quotient recorders one associated with each module and controlled thereby to a first condition when the fixed sequence is equal to or less than the registered variable sequence and to a second condition when the fixed sequence is greater than the registered variable sequence, (d) means for supplying the four highest order bits of said binary number to the first module of said series as the variable binary sequence, (e) a transfer means associated with each module except the last module of said series and controlled by the associated module and its associated quotient recorder for registering as the first portion of the variable sequence in the succeeding module of said series the difference resulting from the subtraction when the associated recorder is in its first condition and the final four bits of the variable sequence registered therein when the associated recorder is in its second condition, (f) another connection to each of said modules except the first module of said series controlled by said source for registering as the final portion of the variable sequence in that module the next lower order bit of said binary number not used in a preceding module, (g) output means controlled by said quotient recorders and by the final module of said series for supplying decimal binary code sequences equivalent to said binary number in accordance with the existing conditions of said quotient recorders and the remainder from the last subtraction step.

7. Apparatus for translating a binary number into a decimal binary code, comprising in combination;

(a) a source of signals representing a binary number, (b) a first subtraction module having connections for receiving from said source the four highest order bits of said binary number and adapted for subtracting therefrom a preselected fixed binary sequence, (c) a first quotient recorder controlled by said first module for recording a first condition when the subtraction is completed and a second condition when said fixed sequence is greater than said highest order four bits, (d) a successive series of other subtraction modules following said first module, each capable of receiving a five bit binary sequence and subtracting therefrom said preselected fixed binary sequence, (e) a series of other quotient recorders one associated with each other subtraction module, (f) a transfer means associated with each other subtraction module and controlled by the quotient recorder associated with the preceding module for transferring into the associated module the difference of the preceding subtraction when that quotient recorded is in its first condition and the final four bits of the binary sequence stored in the preceding module when the preceding quotient recorder is in its second condition, (g) each other module having connections to said source for receiving as the fifth bit in its binary sequence the highest order bit in said binary number still unused in any preceding module, (h) a first output means controlled by the final module in said series and its associated quotient recorder for supplying the binary code for the decimal units digit, (i) other output means controlled by said quotient recorders for supplying the binary code for the higher order decimal digits.

8. A binary to decimal binary code translator, comprising in combination;

(a) a first group of relays for receiving signals representing a binary number, one relay for each bit of that number, (b) a second group of relays having connections for receiving the four highest ordered binary bits from said first group, (c) a contact matrix of said second group of relays arranged for effecting the subtraction of binary 1010 from the binary sequence stored in that group, (d) a third group of relays controlled by said contact matrix for storing the difference of the subtraction when said four bits are equal to or greater than binary 1010 and controlled by said first group for storing said four bits when such are less than binary 1010, (1) said third group also having connections for including the fifth highest ordered bit from said binary number in the stored sequence, (e) a succession of other relay groups each capable of storing a binary sequence of five bits, (1) said third group and each other group controlling a contact matrix arranged for effecting the subtraction of binary 1010 from the five bit sequence stored therein, (2) each other group controlled by the contact matrix of the preceding group for receiving the difference of the subtraction when the five bit sequence of said preceding group is equal to or greater than binary 1010 and for receiving the last four bits of the sequence of said preceding group when that sequence is less than binary 1010, (3) each successive group also controlled by said first group for including the next unused lower ordered bit of said binary number as the fifth bit of that group sequence, (f) a quotient gate for each group of relays except said first group operable to a first condition in response to a completed subtraction process and to a second condition in response to a borrow signal in the highest ordered position of said binary sequence stored in that group, (g) a readout means controlled by the final group and the associated quotient gate for recording the remainder from the final subtraction process as the units digit of the decimal binary code output, (h) another readout means controlled by the several quotient gates for recording the conditions of said gates as the tens digit of the decimal binary code output.

9. Apparatus for translating a binary number into a decimal binary code, comprising in combination;

(a) a signal source for supplying signals representing a binary number of $n$ bits which is the equivalent of a decimal number of more than two digits, (b) a first series of lowest order having ($n$–3) subtraction modules, each capable of registering as a minuend a variable binary sequence and subtracting therefrom the fixed binary subtrahend 1010, (1) the first module of said first series having connections for receiving the four highest order bits of the binary number from said source, (c) other successively higher order series of subtraction modules, two less than the number of digits in the equivalent decimal number, each module capable of registering as a minuend a variable binary sequence and subtracting therefrom the fixed binary subtrahend 1010, (1) each other series having three less modules than the next lower order series, (d) a quotient gate for each module in each series controlled by its associated module to a first condition when the subtraction difference has a positive character and to a second condition when the difference has a negative character, (e) a transfer means associated with each module except the last in each series and controlled by the associated module and quotient gate for transferring as the initial portion of the minuend sequence into the succeeding module of the series the subtraction difference when that associated quotient gate is in its first condition and a selected final portion of the registered minuend when that quotient gate is in its second condition, (1) each module except the first in said first series having connections to said source for receiving the next unused lower order bit as the final bit of the minuend sequence, (2) each module except the first in each other series having connections to the quotient gates associated with the next lower order series for receiving the final bit of its minuend sequence in accordance with the condition of the next unused quotient gate in the series, (f) the first module of each other series having connections for registering a minuend sequence in accordance with the condition of the first four quotient gates associated with the next lower order series of modules, (g) an output means associated with the last module of each series and controlled by that module and the associated quotient gate for registering a four-bit binary sequence representing the corresponding digit in decimal binary code, (1) said sequence being registered as the difference of the final subtraction when the associated quotient gate is in its first condition and from the final portion of the registered minuend when that quotient gate is in its second condition, (h) another output means having connections for registering a four-bit binary sequence representing the highest order digit in the decimal binary code in accordance with the conditions of the quotient gates associated with the highest order series of modules.

References Cited by the Examiner

UNITED STATES PATENTS

| | | | |
|---|---|---|---|
| 2,444,042 | 6/1948 | Hartley et al. | 235—155 |
| 2,860,831 | 11/1958 | Hobbs | 235—61 |
| 3,082,950 | 3/1963 | Hogan | 235—155 |

DARYL W. COOK, *Acting Primary Examiner.*

MALCOLM A. MORRISON, *Examiner.*

A. L. NEWMAN, *Assistant Examiner.*